May 10, 1949.  P. TATLOW  2,469,905
EPICYCLIC MECHANISM
Filed Feb. 15, 1946
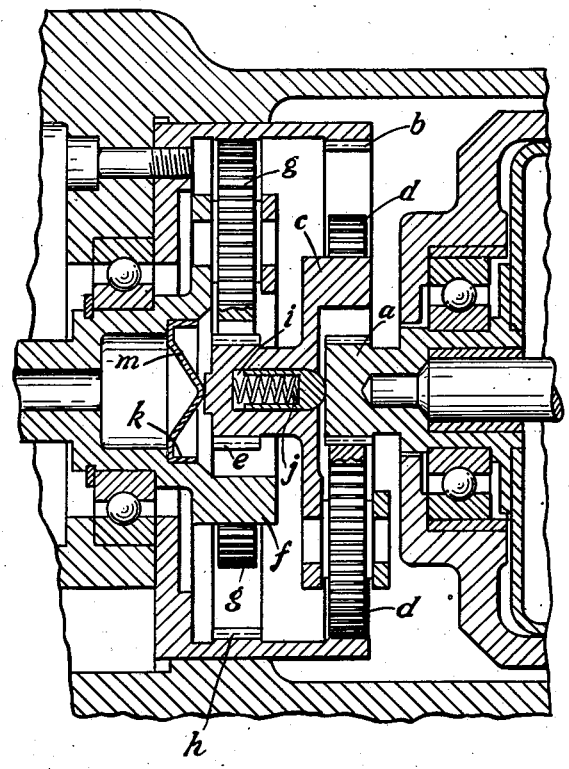
-INVENTOR-
PERCY TATLOW
BY
-ATTORNEY- Patented May 10, 1949

2,469,905

UNITED STATES PATENT OFFICE 2,469,905

EPICYCLIC MECHANISM

Percy Tatlow, London, England, assignor to Rotax Limited, London, England

Application February 15, 1946, Serial No. 647,842
In Great Britain December 14, 1944

Section 1, Public Law 690, August 8, 1946
Patent expires December 14, 1964

5 Claims. (Cl. 74—801)

This invention relates to epicyclic mechanisms, as described and claimed in the specification of U. S. Letters Patent No. 2,357,561.

The invention forming the subject of my earlier specification above-mentioned comprises an epicyclic mechanism, in which the planet pinion carriers of different trains are mutually supported through the medium of the intermediate pinions and lateral thrust rings, the mechanism being of the kind adapted to transmit motion from an electric motor to a shaft or other member to be driven, and consisting of a plurality of epicyclic trains.

The present invention consists of a resilient and axially arranged thrust piece arranged at one or each of several positions for giving endwise support to one or more planet pinion carriers.

The accompanying drawing is a sectional side view of an epicyclic mechanism embodying the invention. The epicyclic mechanism shown in the drawing comprises a driving sun pinion $a$ adapted to receive motion from an electric motor (not shown), a fixed internally toother annulus $b$, a planet carrier $c$ on which are mounted planet pinions $d$ engaging the sun pinion and the annulus, a second sun pinion $e$ on the carrier, and a second planet carrier $f$ adapted to impart motion to a driven shaft, the second planet carrier having mounted on it planet pinions $g$ which engage the second sun pinion and a second fixed annulus $h$.

In carrying the invention into effect as shown, I give endwise support to the member forming the first planet pinion carrier $c$ and the second sun pinion $e$, by arranging in a bore $i$ on the axis of this member a spring loaded thrust piece $j$ which at its outer end abuts against the adjacent end face of the first sun pinion $a$. Also I arrange across an axial recess or cavity $k$ in the second plane pinion carrier $f$, a dished member $m$ having a shallow conical base the apex of which abuts centrally against the end face of the second sun pinion $e$. Alternatively I may employ in place of the conical thrust piece formed by the dished member $m$, a spring loaded thrust piece similar to that indicated by $j$. Or I may interchange the positions of the spring loaded thrust piece and the dished member.

By means of the present invention I am able to meet certain constructional requirements which cannot be conveniently met by the thrust rings specified in my earlier specification above-mentioned.

Having thus described my invention what I claim as new and desire to secure by Letters Patent is:

1. In a gear mechanism comprising a pair of bearings axially aligned relative to and spaced from each other, and a gear train including orbital gear means, the combination of members and portions of said train respectively adapted to be journaled by and to have thrust relation to said bearings, elements of the train between said bearings including sun and planet gear and planet-gear carrier element means disposed in radial floating relation to each other and to said orbital gear means, and means providing endwise support for a carrier element of said carrier-element means including means causing said portions to be biased in axially opposite resilient yieldable thrust relation to said bearings.

2. In a gear mechanism comprising a pair of bearings axially aligned relative to and spaced from each other, and a gear train including orbital gear means, the combination of members and portions of said train respectively adapted to be journaled by and to have thrust relation to said bearings, elements of the train between said bearings including sun and planet gear and planet-gear carrier-element means disposed in radial floating relation to each other and to said orbital gear means, and means providing endwise support for a carrier element of said carrier-element means including means between a sun gear and a carrier, respectively, causing said portions to be biased in axially opposite resilient yieldable thrust relation to said bearings.

3. In a gear mechanism comprising a pair of bearings axially aligned relative to and spaced from each other, and a gear train including orbital gear means, the combination of members and portions of said train respectively adapted to be journaled by and to have thrust relation to said bearings, elements of the train between said bearings including sun and planet gear and planet-gear carrier-element means disposed in radial floating relation to each other and to said orbital gear means, and means providing endwise support for a carrier element of said carrier-element means including means adapted to be supported by a carrier and causing said portions to be biased in axially opposite resilient yieldable thrust relation to said bearings.

4. In combination, a pair of bearings axially spaced from each other, a pair of fixed orbital gears between the bearings axially spaced relative to each other and to the bearings, a rotatable carrier journaled by one of said bearings, planet gears journaled on said carrier and meshing with the adjacent orbital gear, a sun gear journaled by the other of said bearings, a carrier in floating position between said planet gears and said sun gear and having a sun gear meshing with said planet gears, planet pinions rotatively carried by said floating carrier and meshing with the other of said orbital gears and with said first sun gear, and axial thrust means between each of said carriers and the adjacent sun gear, at least one of which thrust means has a portion capable in operation of automatic axial movement and exerting axial force directly between its adjacent carrier and sun gear transmitted between said bearings.

5. In combination, a pair of bearings axially spaced from each other, toothed annulus means between the bearings, rotatable means journaled in each of said bearings at least one of which rotatable means is a sun gear, gear means connected between said rotatable means including a floating carrier carrying planet gears meshing with said sun gear and with said toothed annulus means and axial thrust means operating through said floating carrier to exert opposite axial forces between said bearings.

PERCY TATLOW.

REFERENCES CITED

The following references are of record in the file of this patent:

UNITED STATES PATENTS

| Number | Name | Date |
|---|---|---|
| 1,298,401 | Ricardo | Mar. 25, 1919 |
| 1,347,785 | Libby | July 27, 1920 |
| 1,442,795 | Cook | Jan. 23, 1923 |
| 1,600,597 | Menges | Sept. 21, 1926 |
| 1,611,118 | Lanquetin | Dec. 14, 1926 |
| 1,866,127 | Persons | July 5, 1932 |
| 1,939,494 | Goodman | Dec. 12, 1933 |
| 2,332,163 | Nardone | Oct. 19, 1943 |
| 2,357,561 | Tatlow | Sept. 5, 1944 |